(12) United States Patent
Hsiao et al.

(10) Patent No.: US 12,438,393 B2
(45) Date of Patent: Oct. 7, 2025

(54) WIRELESS CHARGING DEVICE WITH HEAT DISSIPATION STRUCTURE

(71) Applicants: Inventec (Pudong) Technology Corporation, Shanghai (CN); INVENTEC CORPORATION, Taipei (TW)

(72) Inventors: Chi-Cheng Hsiao, Taipei (TW); Ming-Hung Shih, Taipei (TW); Juin Yi Wu, Taipei (TW); Kai-Wen Lu, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 626 days.

(21) Appl. No.: 17/940,064

(22) Filed: Sep. 8, 2022

(65) Prior Publication Data

US 2023/0411995 A1 Dec. 21, 2023

(30) Foreign Application Priority Data

May 26, 2022 (CN) .......................... 202210587163.9

(51) Int. Cl.
*H01M 10/46* (2006.01)
*H02J 7/00* (2006.01)
*H02J 50/00* (2016.01)
*H05K 7/20* (2006.01)
*H02J 50/10* (2016.01)

(52) U.S. Cl.
CPC .......... *H02J 50/005* (2020.01); *H02J 7/0044* (2013.01); *H05K 7/20909* (2013.01); *H02J 50/10* (2016.02)

(58) Field of Classification Search
CPC ........ H02J 7/0044; H02J 7/0042; H02J 50/10; H02J 50/005; H05K 7/20909
USPC ................. 320/107, 114, 115, 116, 150, 153
See application file for complete search history.

(56) References Cited

U.S. PATENT DOCUMENTS

| 2022/0233991 A1* | 7/2022 | Conrad | F24F 8/00 |
| 2023/0187111 A1* | 6/2023 | Daga | B60L 53/124 |
| | | | 307/104 |

FOREIGN PATENT DOCUMENTS

| EP | 3961849 A1 * | 3/2022 | H02J 50/10 |
| JP | 3203153 U * | 3/2016 | H02J 50/12 |
| JP | 2022549159 A * | 11/2022 | F26B 5/04 |

* cited by examiner

*Primary Examiner* — Edward Tso
(74) *Attorney, Agent, or Firm* — Troutman Pepper Locke LLP; Tim Tingkang Xia, Esq.

(57) ABSTRACT

A wireless charging device includes a casing, a wireless charging module, and an air-flow generator. The casing includes a housing part and a carrier plate disposed in the housing part to divide internal space of the housing part into a first accommodation space and a second accommodation space. The casing has an air inlet, an air outlet, and an opening. The carrier plate has a through hole. The air inlet, the air outlet, the opening, and the through hole are in fluid communication with the first accommodation space and the second accommodation space. The wireless charging module is located in the first accommodation space for charging a mobile device supported by the carrier plate. The air-flow generator is located in the first accommodation space for creating an airflow flowing through the air inlet, the second accommodation space, the through hole, the first accommodation space, and the air outlet.

10 Claims, 3 Drawing Sheets

WIRELESS CHARGING DEVICE WITH HEAT DISSIPATION STRUCTURE

CROSS-REFERENCE TO RELATED APPLICATIONS

This non-provisional application claims priority under 35 U.S.C. § 119(a) on Patent Application No(s). 202210587163.9 filed in China, P.R.C. on May 26, 2022, the entire contents of which are hereby incorporated by reference.

BACKGROUND OF THE INVENTION

Technical Field of the Invention

The present disclosure relates to a charging device, more particularly to a wireless charging device.

Description of the Related Art

Nowadays, charging efficiency of wireless charging stands to smart phones needs to be increased for larger battery capacity and higher power consumption due to improved computing performance of smart phones than ever.

However, high charging efficiency will generate a large amount of heat during energy conversion. The heat is easily accumulated in the charging stand and the smart phone, such that the performance of the smart phone may be lowered due to overheat protection thereof, or even the smart phone may be damaged. Therefore, how to increase the heat dissipation efficiency of the charging stand itself and the heat dissipation efficiency of the mobile phone is an important issue in this field.

SUMMARY OF THE INVENTION

The present disclosure provides a wireless charging device capable of increasing the heat dissipation efficiency of the charging device itself and the heat dissipation efficiency of the mobile phone.

According to one aspect of the present disclosure, a wireless charging device adapted for charging a mobile device includes a casing, at least one wireless charging module, and an air-flow generator. The casing includes a housing part and a carrier plate. The carrier plate is disposed in the housing part to divide an internal space of the housing part into a first accommodation space and a second accommodation space. The casing has at least one air inlet, at least one air outlet, and an opening. The at least one air inlet and the opening are in fluid communication with the second accommodation space, the at least one air outlet is in fluid communication with the first accommodation space, and the carrier plate has at least one through hole in fluid communication with the first accommodation space and the second accommodation space. The carrier plate is configured to support the mobile device. The at least one wireless charging module is located in the first accommodation space and configured to charge the mobile device. The air-flow generator is located in the first accommodation space and configured to create an airflow flowing through the at least one air inlet, the second accommodation space, the at least one through hole, the first accommodation space, and the at least one air outlet.

According to the wireless charging device discussed above, the gap between the mobile device and the carrier plate and the through holes of the anti-slip pad enable fluid communication between the first accommodation space and the second accommodation space, such that the airflow created by the air-flow generator is able to flow through the first accommodation space and the second accommodation space for dissipating the wireless charging module and the circuit board in the first accommodation space and the mobile device in the second accommodation space, thereby increasing the heat dissipation efficiency of the wireless charging device itself and the heat dissipation efficiency of the mobile device.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
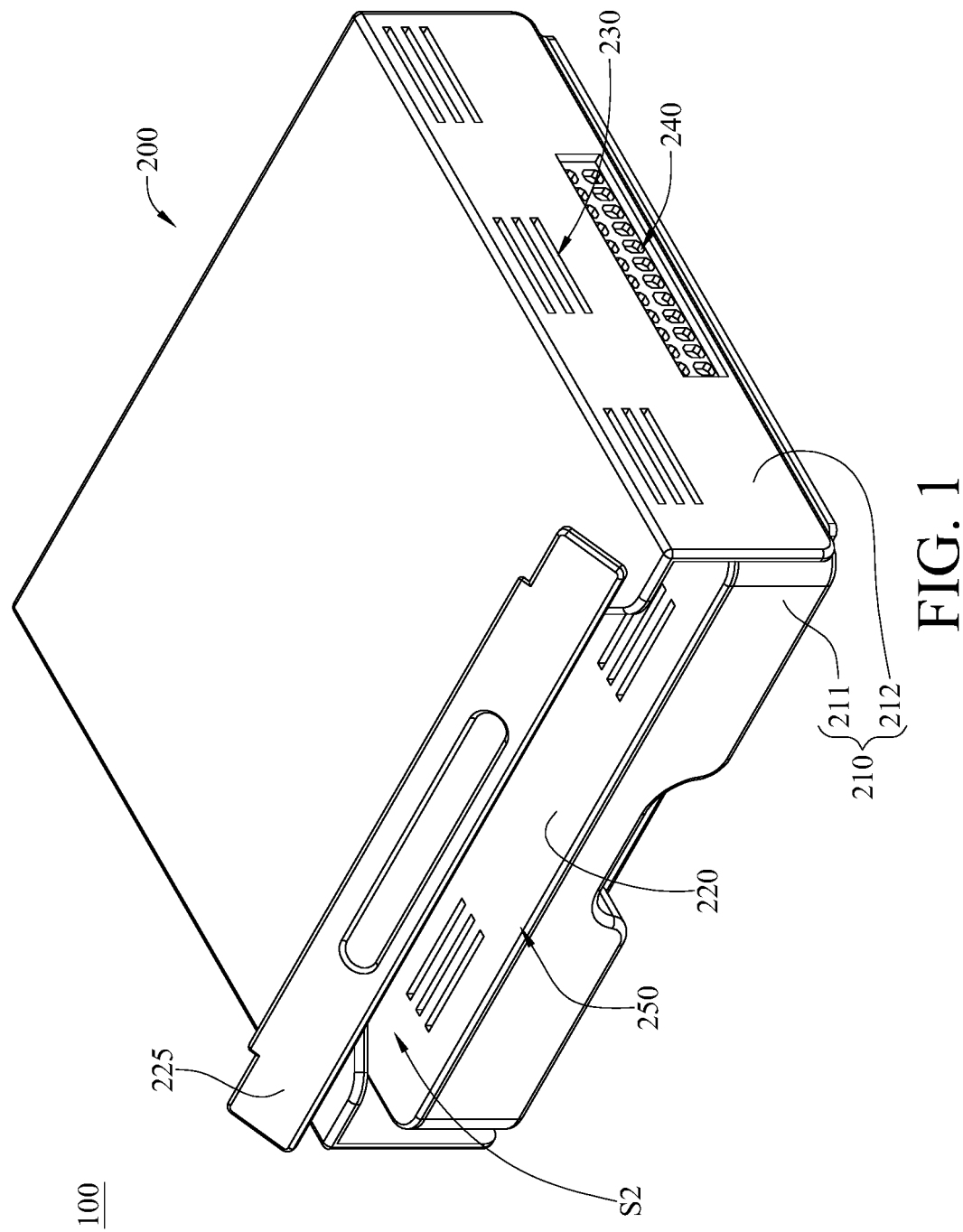
FIG. 1 is a perspective view of a wireless charging device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
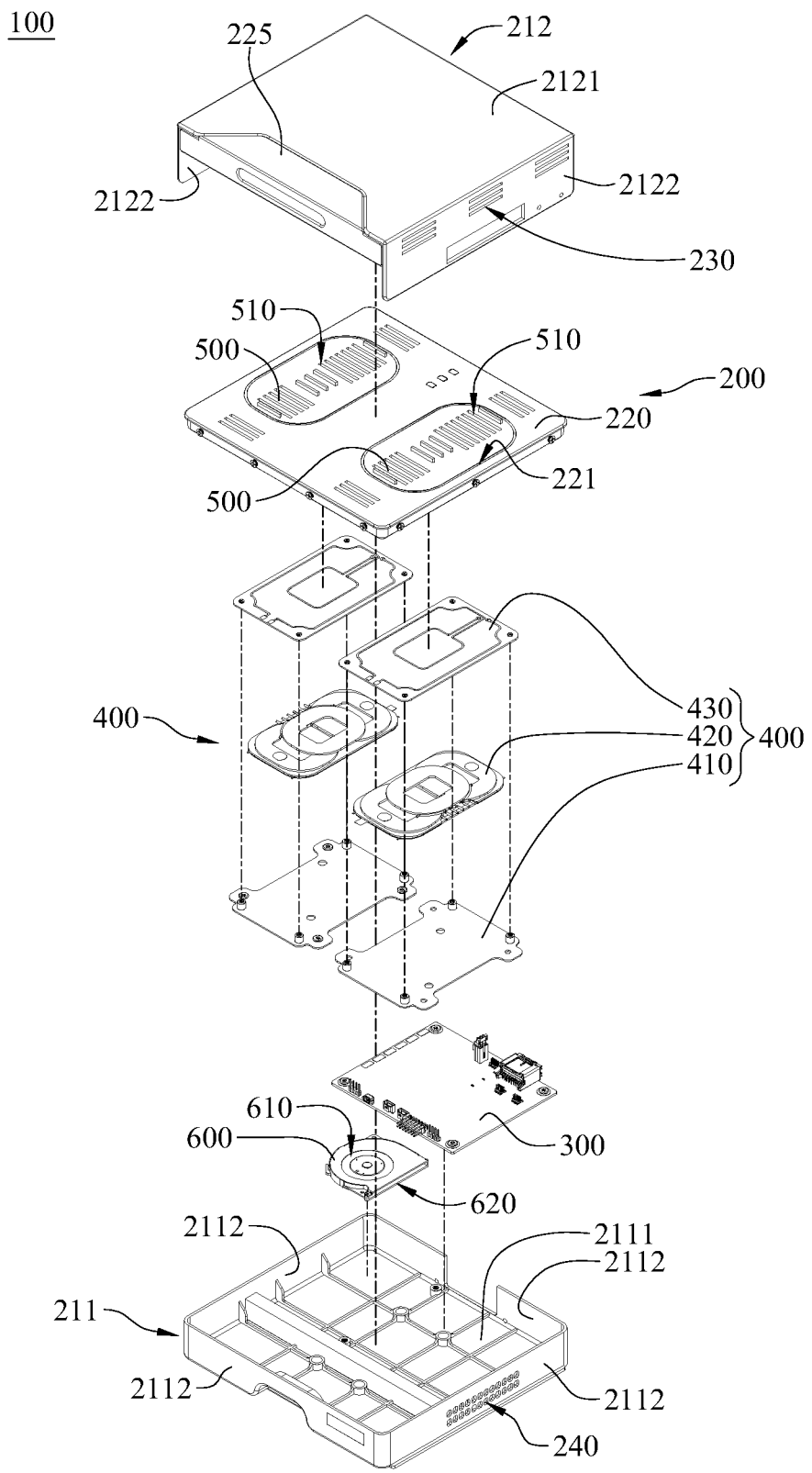
FIG. 2 is an exploded view of the wireless charging device in FIG. 1.
Figure 3:
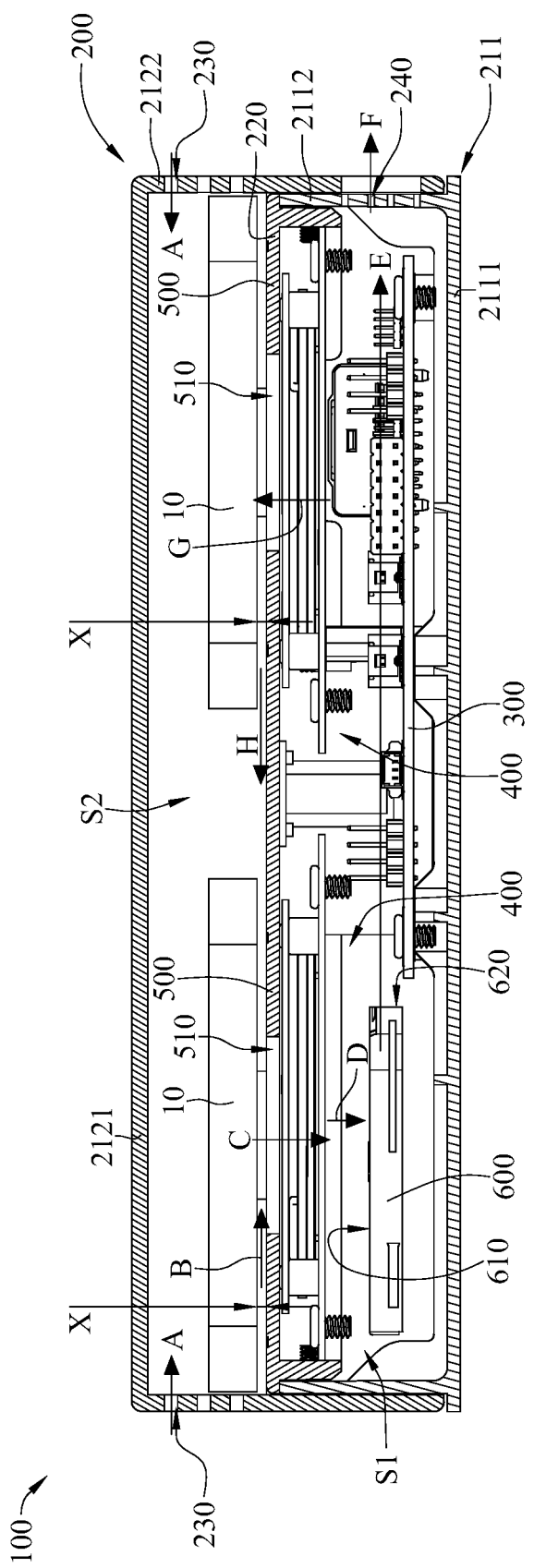
FIG. 3 is a cross-sectional view of the wireless charging device in FIG. 1.

Please refer to FIGS. 1-3, where FIG. 1 is a perspective view of a wireless charging device according to an embodiment of the present disclosure, FIG. 2 is an exploded view of the wireless charging device in FIG. 1, and FIG. 3 is a cross-sectional view of the wireless charging device in FIG. 1.

In this embodiment, a wireless charging device 100 configured to charge at least one mobile device 10 is provided. The wireless charging device 100 includes a casing 200, a circuit board 300, two wireless charging modules 400, two anti-slip pads 500, and an air-flow generator 600. Please be noted that the quantity of the mobile devices 10 depicted in FIG. 3 is exemplary for better understanding the wireless charging device 100 but is not intended to limit the present disclosure.

The casing 200 includes a housing part 210, a carrier plate 220, and a cover 225. The housing part 210 includes a first case part 211 and a second case part 212. The first case part 211 includes a bottom plate 2111 and a plurality of first lateral plates 2112. The first lateral plates 2112 are respectively connected to different sides of the bottom plate 2111. The second case part 212 includes a top plate 2121 and a plurality of second lateral plates 2122. The second lateral plates 2122 are respectively connected to different sides of the top plate 2121. The second lateral plates 2122 of the second case part 212 are respectively connected to sides of the first lateral plates 2112 located away from the bottom plate 2111. The carrier plate 220 is disposed in the housing part 210 to divide the internal space of the housing part 210 into a first accommodation space S1 and a second accommodation space S2. As shown, the first lateral plates 2112, the bottom plate 2111, and the carrier plate 220 together define the first accommodation space S1 therebetween, and the second lateral plates 2122, the top plate 2121, and the carrier plate 220 together define the second accommodation space S2 therebetween.

In this embodiment, the casing 200 has a plurality of air inlets 230, a plurality of air outlets 240, and an opening 250. The air inlets 230 are located on the second lateral plates 2122 of the second case part 212 and are in fluid communication with the second accommodation space S2. The air outlets 240 are located on one of the first lateral plates 2112 and are in fluid communication with the first accommodation space S1. The top plate 2121 of the second case part 212 and the first lateral plates 2112 of the first case part 211 together define the opening 250 therebetween, and the opening 250 is in fluid communication with the second accommodation space S2. The opening 250 is for the placement of one or more of the mobile devices 10 into the casing 200. The cover 225 is movably disposed to the top plate 2121 of the second case part 212 and is configured to cover or expose the opening 250 of the housing part 210.

Please be noted that the quantity of the air inlets or the air outlets may be modified as required and are not intended to limit the present disclosure.

In this embodiment, the carrier plate 220 has two placement areas 221 on a surface thereof which faces towards the second accommodation space S2. The placement areas 221 are predetermined areas used to support the mobile devices 10 when charging the mobile devices 10. The wireless charging modules 400 are located in the first accommodation space S1 and may be arranged to correspond to the placement areas 221, thus the wireless charging modules 400 are able to charge the mobile devices 10 when the mobile devices 10 are in the placement areas 221.

In this embodiment, the circuit board 300 is located in the first accommodation space S1 and is mounted on the bottom plate 2111 of the first case part 211. The circuit board 300 may have electronic elements, such as a signal reminder and an USB TYPE-C connector.

The wireless charging modules 400 each include a mount 410 disposed on the circuit board 300, a charging coil 420 disposed on the mount 410, and a wireless communication antenna board 430 mounted on the mount 410, where the charging coil 420 is located between the mount 410 and the wireless communication antenna board 430.

The anti-slip pads 500 are located in the second accommodation space S2 and are respectively disposed within the placement areas 221 of the carrier plate 220. The anti-slip pads 500 each have a plurality of through holes 510 in fluid communication with the first accommodation space S1 and the second accommodation space S2. In more detail, the anti-slip pads 500 may each have one or more protrusions configured to support the mobile devices 10 so that the mobile devices 10 are spaced apart from the carrier plate 220 by a gap (e.g., X shown in FIG. 3) in fluid communication with the air inlets 230 and the through holes 510.

Please be noted that, in some other embodiments of the present disclosure, there may be only one through hole within each placement area. Please also be noted that, in some other embodiments of the present disclosure, there may be only one anti-slip pad having the through holes; that is, the through holes may be located in only one placement area.

Please be noted that, in some other embodiments of the present disclosure, the anti-slip pads are optional, and the through holes may be directly disposed on the carrier plate.

The air-flow generator 600 is, for example, a centrifugal fan. The air-flow generator 600 is located in the first accommodation space S1 and disposed at a side of the wireless charging modules 400 close to the bottom plate 2111 of the first case part 211. The air-flow generator 600 has an inhalation port 610 and an exhalation port 620. The inhalation port 610 faces towards the carrier plate 220. The exhalation port 620 faces towards the circuit board 300 and at least one of the air outlets 240. The air-flow generator 600 is configured to generate negative pressure in the first accommodation space S1 to create an airflow to flow into the second accommodation space S2 via the air inlets 230 from outside so as to dissipate the mobile devices 10, and then the airflow flows out of the air outlets 240 sequentially via the through holes 510 and the first accommodation space S1.

More detail of the wireless charging device 100 are given below with reference to FIG. 3. During the operation of the air-flow generator 600, the air-flow generator 600 incur air to flow into the casing 200 from outside, thus, as denoted by arrows A, an airflow flowing into the second accommodation space S2 via the air inlets 230 is created. The airflow in the second accommodation space S2 flows over the surfaces of the mobile device located close to the air inlets 230 and therefore flows into the gap X under the mobile device 10 (as denoted by an arrow B). The airflow flowing into the gap X also flows into the first accommodation space S1 via the through holes 510 (as denoted by an arrow C). The airflow flowing through the through holes 510 is drawn into the air-flow generator 600 via the inhalation port 610 (as denoted by an arrow D) and then is discharged via the exhalation port 620 and thus flowing over the circuit board 300 (as denoted by an arrow E). The airflow takes the waste heat generated by the circuit board 300 away with it when flowing across the circuit board 300. Then, the air flow is emitted out of the first accommodation space S1 via the air outlets 240 (as denoted by an arrow F). Meanwhile, the airflow flowing over the circuit board 300 also flows towards and into the other gap X via the through holes 510 located close to the air outlets 240 (as denoted by an arrows G and H). As shown, part of the airflow as indicated by arrow H will converge with the airflow indicated by arrows B-D and therefore achieve an air circulation to enhance the heat dissipation efficiency to the mobile devices 10.

According to the wireless charging device discussed above, the gap between the mobile device and the carrier plate and the through holes of the anti-slip pad enable fluid communication between the first accommodation space and the second accommodation space, such that the airflow created by the air-flow generator is able to flow through the first accommodation space and the second accommodation space for dissipating the wireless charging module and the circuit board in the first accommodation space and the mobile device in the second accommodation space, thereby increasing the heat dissipation efficiency of the wireless charging device itself and the heat dissipation efficiency of the mobile device.

In some other embodiments of the present disclosure, the wireless charging device may be applied to an in-vehicle device of, for example, an electric car, a self-driving car, or a semi-driving car.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A wireless charging device, adapted for charging a mobile device, comprising:
   a casing comprising a housing part and a carrier plate, wherein the carrier plate is disposed in the housing part to divide an internal space of the housing part into a first accommodation space and a second accommodation space, the casing has at least one air inlet, at least one air outlet, and an opening, the at least one air inlet and the opening are in fluid communication with the second accommodation space, the at least one air outlet is in fluid communication with the first accommodation space, the carrier plate has at least one through hole in fluid communication with the first accommodation space and the second accommodation space, and the carrier plate is configured to support the mobile device;
   at least one wireless charging module located in the first accommodation space and configured to charge the mobile device; and
   an air-flow generator located in the first accommodation space and configured to create an airflow flowing through the at least one air inlet, the second accommodation space, the at least one through hole, the first accommodation space, and the at least one air outlet.

2. The wireless charging device according to claim 1, wherein the housing part comprises a first case part and a second case part, the first case part comprises a bottom plate and a plurality of first lateral plates, the plurality of first lateral plates are respectively connected to different sides of the bottom plate, the second case part comprises a top plate and a plurality of second lateral plates, the plurality of second lateral plates are respectively connected to different sides of the top plate, the plurality of second lateral plates of the second case part are respectively connected to sides of the plurality of first lateral plates of the first case part located away from the bottom plate, the top plate and the plurality of first lateral plates together define the opening therebetween, a quantity of the at least one air inlet is at least two, the air inlets are located on the plurality of second lateral plates, a quantity of the at least one air outlet is at least two, and the air outlets are located on one of the plurality of first lateral plates.

3. The wireless charging device according to claim 2, wherein the casing further comprises a cover movably disposed to the top plate of the second case part, and the cover is configured to cover or expose the opening.

4. The wireless charging device according to claim 2, further comprising a circuit board, wherein the at least one wireless charging module comprises a mount and a charging coil, the mount is disposed on the circuit board, and the charging coil is disposed on the mount.

5. The wireless charging device according to claim 4, wherein the at least one wireless charging module further comprises a wireless communication antenna board mounted on the mount, and the charging coil is located between the mount and the wireless communication antenna board.

6. The wireless charging device according to claim 4, wherein a quantity of the at least one wireless charging module is two, the air-flow generator is located at a side of one of the wireless charging modules close to the bottom plate of the first case part.

7. The wireless charging device according to claim 4, wherein the air-flow generator is a centrifugal fan, the air-flow generator has an inhalation port and an exhalation port, the inhalation port faces towards the carrier plate, and the exhalation port faces towards the circuit board.

8. The wireless charging device according to claim 2, wherein the carrier plate has at least one placement area on a surface thereof which faces towards the second accommodation space, the at least one placement area is configured to support the mobile device, the at least one through hole is located within the at least one placement area of the carrier plate.

9. The wireless charging device according to claim 8, further comprising an anti-slip pad, wherein the anti-slip pad is located in the second accommodation space and disposed within the at least one placement area of the carrier plate, and the anti-slip pad is configured to support the mobile device.

10. The wireless charging device according to claim 9, wherein the mobile device supported by the anti-slip pad is spaced apart from the carrier plate by a gap, and the gap is in fluid communication with the at least one air inlet and the at least one through hole.

* * * * *